United States Patent [19]
Hess

[11] Patent Number: 6,062,086
[45] Date of Patent: May 16, 2000

[54] INTERPOSER DEVICE FOR ADJUSTING AND CONTROLLING THE SHOCK RESPONSE OF A SHAKER TABLE ASSEMBLY

[75] Inventor: John C. Hess, Boulder, Colo.

[73] Assignee: QualMark Corporation, Denver, Colo.

[21] Appl. No.: 09/185,327

[22] Filed: Nov. 3, 1998

[51] Int. Cl.⁷ ............................... B06B 3/00; G01M 7/00
[52] U.S. Cl. ...................................................... 73/663
[58] Field of Search ........................... 73/662, 663, 666, 73/664, 665, 667, 668

[56] References Cited

U.S. PATENT DOCUMENTS

| | | | |
|---|---|---|---|
| 3,393,554 | 7/1968 | Tiso | 73/665 |
| 4,181,027 | 1/1980 | Talbott, Jr. | 73/665 |
| 4,181,029 | 1/1980 | Talbott et al. | 73/665 |
| 4,248,324 | 2/1981 | Mifsud | 181/121 |
| 4,602,555 | 7/1986 | Bushey | 92/661 |
| 4,735,089 | 4/1988 | Baker et al. | 73/663 |
| 5,024,096 | 6/1991 | Gregory et al. | 73/663 |
| 5,138,884 | 8/1992 | Bonavia | 73/662 |
| 5,144,176 | 9/1992 | Popper | 310/81 |
| 5,365,788 | 11/1994 | Hobbs | 73/665 |
| 5,400,640 | 3/1995 | Stuckey | 73/12.14 |
| 5,412,991 | 5/1995 | Hobbs | 73/663 |
| 5,517,857 | 5/1996 | Hobbs | 73/571 |
| 5,540,109 | 7/1996 | Hobbs | 73/865.6 |
| 5,589,637 | 12/1996 | Hobbs | 73/663 |
| 5,594,177 | 1/1997 | Hanse | 73/663 |
| 5,744,724 | 4/1998 | Hobbs | 73/665 |
| 5,836,202 | 11/1998 | Hobbs | 73/665 |

*Primary Examiner*—Richard A. Moller
*Attorney, Agent, or Firm*—Emery L. Tracy

[57] ABSTRACT

An interposer device for adjusting and controlling the shock response of a shaker table assembly is provided. The shaker table assembly has a mounting table and at least one vibrator assembly. The interposer device comprises a substantially planar plate mounted between the mounting table and the vibrator assembly with the planar plate having a predetermined desired spring constant.

20 Claims, 2 Drawing Sheets

INTERPOSER DEVICE FOR ADJUSTING AND CONTROLLING THE SHOCK RESPONSE OF A SHAKER TABLE ASSEMBLY

BACKGROUND OF THE INVENTION

1. Field of the Invention

This invention relates generally to a shaker table assembly to which manufactured devices are mounted for vibrational testing and, more particularly, it relates to an interposer device for adjusting and controlling spring constants for the shaker table assembly.

2. Description of the Prior Art

Shaker tables for testing the reliability and durability of manufactured devices are well known in the art. Such shaker tables are used either under controlled laboratory conditions or in conjunction with an assembly line. Often, shaker tables are mounted with thermal chambers, which gives the added flexibility of testing for defects in the manufactured product which can be exposed by elevated temperature or temperature cycling.

The shaker tables typically include a platform or mounting table upon which a device to be tested is mounted. At least one vibrator assembly is typically attached to the mounting table by a piston mounting bolt and vibrates the mounting table thereby vibrating the device mounted upon the mounting table. The vibrator assembly generally consists of a housing having a slidable piston mounted therein. The slidable piston strikes a programmer comprising a shock absorbing material to achieve a predicted predetermined shock response. The programmer is typically press-fit mounted within the housing adjacent the mounting table and typically secured therein by either epoxy or set screws. Unfortunately, upon continual striking of the programmer by the slidable piston of the vibrator assembly of the prior art, the epoxy tended to delaminate from around the programmer and the programmer becomes detached from within the housing and ultimately causes the vibrator assembly to fail.

In order to adjust the predicted predetermined spring constant of the prior art shaker tables between the mounting table and the vibrator assembly, the entire vibrator assembly had to be completely removed from the mounting table and a new vibrator assembly having the necessary predicted predetermined spring constant had to be mounted to the mounting table. Or, the vibrator assembly had to be disassembled and the programmer mounted therein had to be either adjusted or replaced within the vibrator assembly. Needless to say, the entire procedure of changing or adjusting the vibrator assembly to change the predicted predetermined spring constant of the vibrator assembly requires a shaker table user to maintain an inventory of vibrator assemblies having various predicted predetermined spring constants and/or requires unnecessary down time of the shaker table and increased labor table to disassemble the vibrator assembly.

Furthermore, as described in the Hobbs, U.S. Pat. No. 5,589,637, the vibrator assembly of the shaker table assembly was susceptible to damage from "fretting". Fretting occurred due to the fact that the mounting table and the housing are constructed from an aluminum material allowing an aluminum oxide layer to form between the mounting table and the housing of the vibrator assembly. Therefore, titanium spacers were mounted between the housing of the vibrator assembly and the mounting table reducing the occurrence of fretting and providing thermal insulation. The spacers only reduced thermal transfer between the mounting table and the housing of the vibrator assembly thereby reducing the potential for thermal damage of the vibrator assembly. The spacers did not address the need for a means for adjusting and controlling the spring constant of the shaker table assembly.

A need exists for an interchangeable interposer device mountable between a mounting table and a vibrator assembly of a shaker table assembly which controls the spring constant of the shaker table assembly. Furthermore, there exists a need for an interchangeable interposer device mountable between a mounting table and a vibrator assembly of a shaker table assembly which is easily interchangeable without disassembly of the vibrator assembly to adjust the spring constant of the entire shaker table assembly.

SUMMARY

The present invention is an improvement to a shaker table assembly. The shaker table assembly has a mounting table and at least one vibrator assembly mounted to the mounting table. The improvement comprises an interchangeable interposer device releasably secured between the mounting table and at least one of the vibrator assemblies. The interposer device has a predetermined spring constant to achieve a desired shock response of the shaker table assembly.

In an embodiment of the present invention, the interposer device has an aperture formed therein. The improvement further comprises a mounting bolt extending through the aperture releasably securing the interposer device between the mounting table and the vibrator assembly.

In another embodiment of the present invention, the interposer device has a slot formed therein. The improvement further comprises a mounting bolt extending through the slot releasably securing the interposer device between the mounting table and the vibrator assembly.

In still another embodiment of the present invention, the interposer device is constructed from a polyethersulfone material.

In yet another embodiment of the present invention, the interposer device is formed from a substantially planar material.

The present invention further includes an interposer device for adjusting and controlling the shock response of a shaker table assembly. The shaker table assembly has a mounting table and at least one vibrator assembly. The interposer device comprises a substantially planar plate mounted between the mounting table and the vibrator assembly with the planar plate having a predetermined desired spring constant.

In an embodiment of the present invention, the plate is releasably secured between the mounting table and the vibrator assembly.

In another embodiment of the present invention, the plate has an aperture formed therein. Preferably, the interposer device further comprises a mounting bolt extending through the aperture releasably securing the plate between the mounting table and the vibrator assembly. Furthermore, the interposer device can have a slot formed therein.

In still another embodiment of the present invention, the planar plate is constructed from a polyethersulfone material.

In yet another embodiment of the present invention, the plate has a surface area, the surface area of the plate defining the spring constant of the interposer device. Also, the plate has a length, the length of the plate defining the spring constant of the interposer device. Furthermore, the plate has a modulus of elasticity, the modulus of elasticity of the plate defining the spring constant of the interposer device.

The present invention additionally includes a method for adjusting and controlling the shock response of a shaker table assembly, The shaker table assembly has a mounting table and at least one vibrator assembly mounted to the mounting table. The method comprises releasably securing an interposer device between the mounting table and the vibrator assembly thereby defining a shock response of the shaker table assembly.

In an embodiment of the present invention, the method further comprises forming an aperture in the interposer device. Also, the method can further comprises forming a slot in the interposer device. Preferably, the method further comprises inserting a bolt through the aperture releasably securing the interposer device between the mounting table and the vibrator assembly.

In another embodiment of the present invention, the method further comprises constructing the interposer device from a polyethersulfone material.

In still another embodiment of the present invention, the method further comprises defining the spring constant of the interposer device by an area, a length, and a modulus of elasticity of the interposer device.

DETAILED DESCRIPTION OF THE PREFERRED EMBODIMENTS

Figure 1:
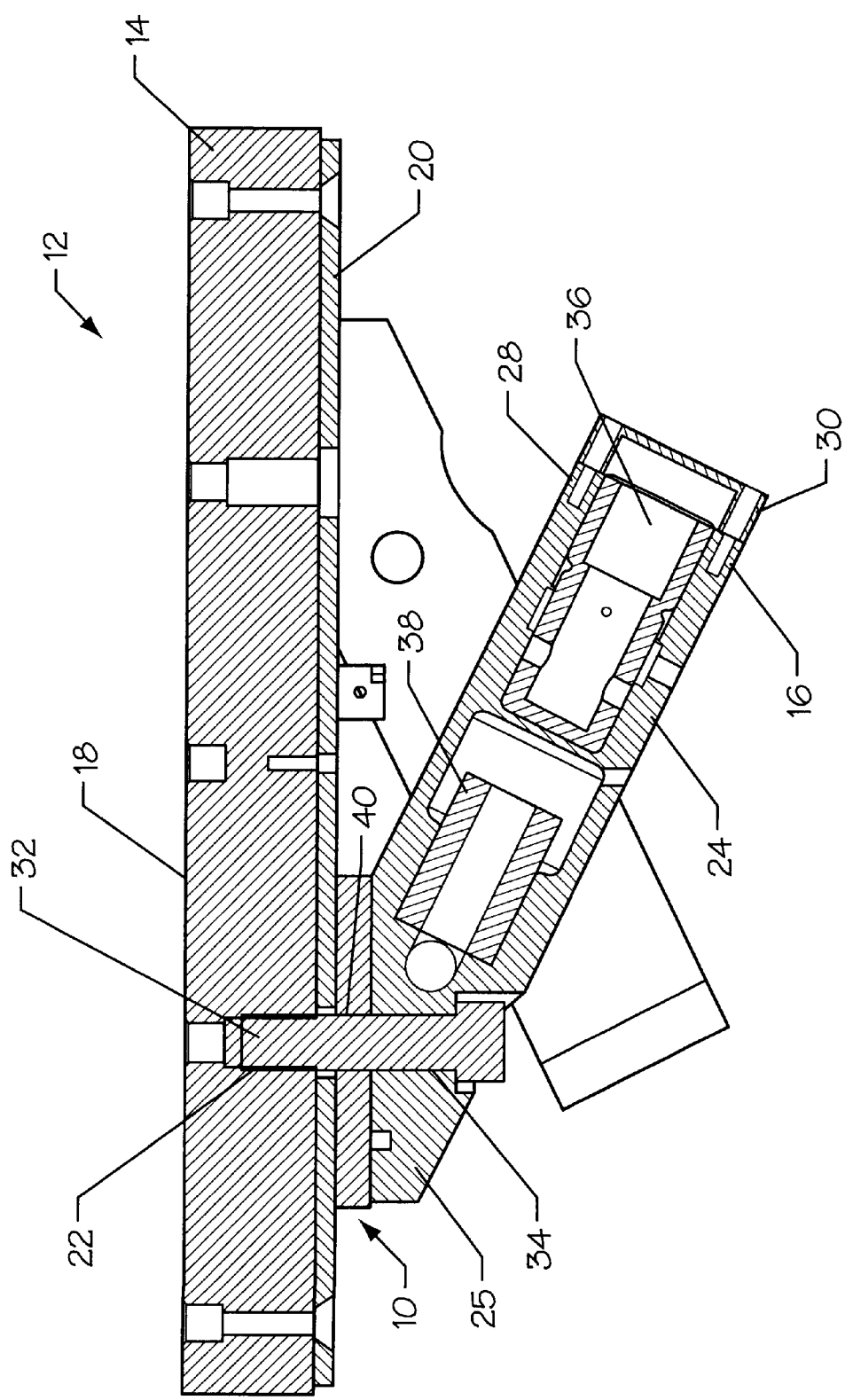
FIG. 1 is a sectional view illustrating a shaker table assembly having a mounting table, a vibrator assembly, and an interposer device constructed in accordance with the present invention.

As illustrated in FIG. 1, the present invention is an interposer device, indicated generally at 10, for controlling and adjusting the shock response of a shaker table assembly 12. The shaker table assembly 12 is generally described in U.S. Pat. No. 5,589,637, assigned to the same assignee of the present invention, and is hereby incorporated herein by reference.

Still referring to FIG. 1, the shaker table assembly 12 includes a platform or mounting table 14 mounted on a foundation (not shown) with at least one vibrator assembly 16 mounted to the mounting table 14 operated to shake the shaker table assembly 12 and an attached testable device or manufactured product (not shown). The foundation is an essentially vibration-free support for the shaker table assembly 12. Although typically supported from below, the shaker table assembly 12 can also be supported from any direction.

The testable device is fastened, coupled, or fixed to the mounting table 14. Preferred methods of fastening include bolting the testable device to the mounting table 14, clamping the testable device to the mounting table 14, creating a vacuum between the testable device and the mounting table 14, or using magnetic forces to attach the testable device to the mounting table 14. A dispersive layer (not shown) within the mounting table 14 and manipulation and arrangement of the vibrator assemblies 16 can allow the testable device to be subjected to randomly distributed multi-axial and multi-rotational, incoherent vibrations with a limited number of vibrator assemblies 16 oriented in one or a limited number of directions and without the need for damping or complex shaker table assembly 12 construction.

The mounting table 14 of the shaker assembly 12 has a top surface 18 and a bottom surface 20 opposite the top surface 18. The testable device is positioned on the top surface 18 of the mounting table 14 and tested in accordance with the manufacturer's or user's specifications. The mounting table 14 further includes a mounting table bore 22 extending from the top surface 18 through to the bottom surface 20 of the mounting table 18 for mounting of the vibrator assembly 16 to the bottom surface 20 of the mounting table 18, as will be discussed further below.

The vibrator assembly 16 of the shaker table assembly 12 can be any device which imparts excitation and a shock response in the mounting table 14 of the shaker table assembly 12. Preferably, the vibrator assembly 16 is a pneumatic air operated vibrator, although other types of vibrator assemblies 16 are within the scope of the present invention. The vibrator assembly 16 can be attached to any part of the mounting table 14. If more than one of the vibrator assemblies 16 are used, the vibrator assemblies 16 should ideally be positioned to impart orthogonal excitations with respect to one another. It should be noted, however, that although the vibrator assembly 16 imparts excitations to the mounting table 14 in only one direction, this can result in excitations appearing at the testable device in any or all the six possible degrees of freedom of motion.

As illustrated in FIG. 1, the vibrator assembly 16 includes a substantially hollow housing 24 having a chamfered end 26 and an open end 28 closed by an end cap 30 secured by at least one threaded mounting bolt 32 to the mounting table 14. The vibrator assembly 16 is attached to the bottom surface 20 of the mounting table 14 by the mounting bolt 32 and vibrates the testable device upon the mounting table 14. The chamfered end 26 of the housing 24 has a housing bore 34 so that the threaded end of the mounting bolt 32 can extend through the housing bore 34 and the mounting table bore 22 of the mounting table 14 to releasably mount the vibrator assembly 16 to the mounting table 14.

In addition to being attached to the bottom surface 20 of the mounting table 14, the vibrator assembly 16 can be attached to the inside surface (not shown) of or disposed within the mounting table 14. Mounting of the vibrator assemblies 16 within the mounting table 14 provide more available space on the top and bottom surface 18, 20 for mounting the testable device on the mounting table 14.

Still referring to FIG. 1, the vibrator assembly 16 of the shaker table assembly 12 includes a slidable piston 36 slidably mounted within the housing 24 nearingly adjacent the open end 28 of the housing 24 and a programmer 38 press-fit mounted within the housing 24 nearingly adjacent the chamfered end 26 of the housing 24. The programmer 38 is strikable by the slidable piston 36 and defines the shock response for the shaker table assembly 12 in that the striking of the programmer 38 by the piston 36 causes the vibrator assembly 16 to impart predetermined excitations on the mounting table 14 and the testable device thereon.

The programmer 38 of the vibrator assembly 16 generally comprises a substantially cylindrical shock absorbing material to achieve a predicted predetermined shock response of the shaker table assembly 12 upon the slidable piston 36 striking the programmer 38. As the slidable piston 36 strikes the programmer 38, the programmer 38 defines the shock response of the shaker table assembly 12. Preferably, the programmer 38 is comprised of a substantially cylindrical material composed of polyehterimide manufactured under the trademark Ultem 2300 by General Electric, although other materials for the programmer 38 are within the scope of the present invention.

Figure 2:
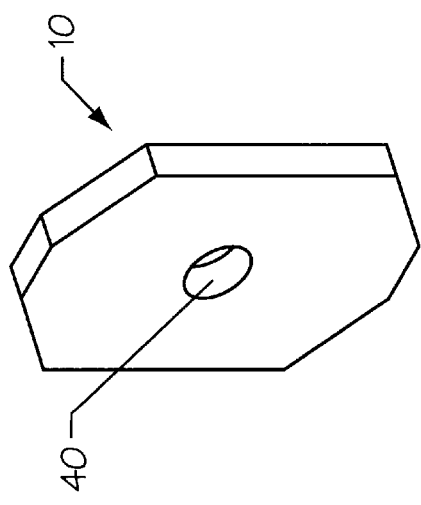
FIG. 2 is a perspective view illustrating the interposer device constructed in accordance with the present invention.

With the striking of the programmer 38 by the piston 36, a predetermined shock response of the shaker table assembly 12 is achieved. In order to adjust and control the predetermined shock response of the shaker table assembly 12, as illustrated in FIG. 2, the interposer device 10 of the present invention is releasably mounted between the chamfered end 26 of the housing 24 of the vibrator assembly 16 and the bottom surface 20 of the mounting table 14. The interposer device 10 interchangeably allows the user to adjust and control the shock response of the shaker table assembly 12 by increasing or decreasing the shock response of the shaker table assembly 12 as desired by the user and required by the testable device.

Preferably, the interposer device 10 of the present invention has an interposer bore 40 aligned with the housing bore 34 and the mounting table bore 22 with the mounting bolt 32 extending through the housing bore 34, the interposer bore 40, and the mounting table bore 22. The mounting bolt 32 releasably secures the interposer device 10 between the chamfered end 26 of the housing 24 of the vibrator assembly 16 and the bottom surface 20 of the mounting table 14 such that the interposer device 10 is easily, readily interchangeable to adjust and control the shock response of the shaker table assembly 12.

The interposer device 10 of the present invention is preferably constructed from any material having a desired spring constant which achieves the shock response desired and required for the testable device. Preferably, the interposer device 10 is constructed from a polyethersulfone material sold under the trademark Radel manufactured by Amoco. It should be noted, however, that the interposer device 10 can be constructed from any type of material including, but not limited to, rubber, plastic, ceramic, etc., depending on the application and the shock response desired and required for the testable device mounted on the mounting table 14 of the shaker table assembly 12.

To achieve the desired spring constant of the interposer device 10 for providing a desired shock response of the shaker table assembly 12 to test the testable device on the mounting table 14 of the shaker table assembly 12, the following equation for the spring constant of the interposer device 10 is followed:

$$K=(A*E)/l$$

where,

K=spring constant,

A=area,

E=modulus of elasticity, and l=length.

Therefore, increasing the spring constant of the interposer device 10 increases the frequencies over which excitation of the shaker table assembly 12 occurs and decreases the overall amplitude. Furthermore, it follows that decreasing the spring constant of the interposer device 10 decreases the range of frequencies over which excitation of the shaker table assembly 12 occurs and increases the overall amplitude, according to the spring constant equation, the area or the modulus of elasticity can be decreased, or the length of the interposer device 10 can be increased. To decrease the spring constant of the interposer device 10, a plurality of apertures 44 or slots 46 can be formed in the interposer device 10 to reduce the area of the interposer device 10.

Figure 3:
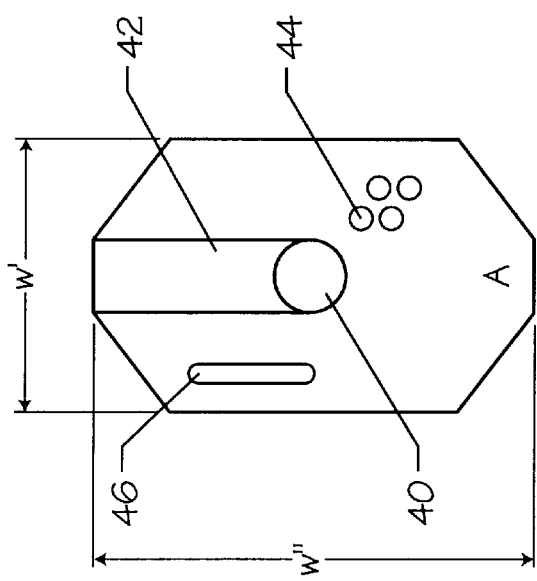
FIG. 3 is a top view illustrating the interposer device of FIG. 2 constructed in accordance with the present invention.

As illustrated in FIG. 3, the interposer device 10 of the present invention has a substantially octagonal shape with a first width w' of approximately 4.7 inches and a second width w" of approximately 2.9 inches. It should be noted, however, that it is within the scope of the present invention to have the interposer device 10 be a variety of shapes including, but not limited, to round, oval, square, rectangular, etc., with various first widths w' and second widths w". Of course, the actual geometrical shape, including the first widths w' and the second widths w", of the interposer device 10 is determined by the required desired shock response of the shaker table assembly 12. As discussed above, according to the spring constant equation, increasing the area A of the interposer device 10 increases the spring constant of the interposer device 10 and increases the shock response of the shaker table assembly 12. On the other hand, decreasing the area A of the interposer device 10 will decrease the spring constant of the interposer device 10 and decreases the shock response of the shaker table assembly 12.

Figure 4:
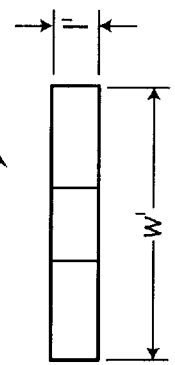
FIG. 4 is an end view illustrating the interposer device of FIG. 2 constructed in accordance with the present invention.

Likewise, as illustrated in FIG. 4, the interposer device 10 of the present invention has a thickness or length l of approximately 0.5 inch. It should be noted, however, that it is within the scope of the present invention to have the length l of the interposer device 10 be any desired length. The actual length l of the interposer device 10 is determined by the required desired spring constant of the interposer device 10 and the desired shock response of the shaker table assembly 12. As discussed above, increasing the length l of the interposer device 10 decreases the spring constant of the interposer device 10 and decreases the range of frequencies excited. On the other hand, decreasing the length l of the interposer device 10 will increase the spring constant of the interposer device and increases the frequencies over which excitation occurs.

Furthermore, the interposer device 10 of the present invention can include a mounting slot 42 such that to replace the interposer device 10, the user merely loosens the mounting bolt 32 and slidably removes the interposer device 10 from between the bottom surface 20 of the mounting table 14 and the chamfered end 26 of the housing 24 of the vibrator assembly 16. It is also within the scope of the present invention to provide other means for removing the interposer device 10 from between the mounting table 14 and the vibrator assembly 16 including, but not limited to, a quick release mechanism (not shown).

The ability to interchange the interposer 10 of the present invention is important when testing the testable devices. It is known that when testing a testable device which is large, a shaker table assembly 12 having a shock response with lower natural frequencies are desired. Likewise, when testing a testable device is small, a shaker table assembly 12 with a shock response having higher natural frequencies are desired. The interposer device 10 of the present invention can be easily and readily interchanged to achieve the desired shock response of the shaker table assembly 12 without having to change and replace the entire vibrator assembly 16 of the shaker table assembly 12.

The interposer device 10 of the present invention is a novel solution to the inherent difficulties of adjusting and controlling the shock response of a shaker table assembly 12. Prior to the invention of the interposer device 10 of the present application, the only way to adjust and control the shock response of the shaker table assembly 12 was to either disassemble the vibrator assembly 16, remove the programmer 38, and replace the programmer 38 with a different programmer having the desired spring constants or to replace the vibrator assembly 16 in its entirety. With the invention of the interposer device 10 of the present application, the user of the shaker table assembly 12 merely only needs to loosen and/or remove the mounting bolt 32 and insert a different interposer device 10 having the desired spring constant to achieve the desired shock response for the testable device.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. In a shaker table assembly having a mounting table and at least one vibrator assembly mounted to the mounting table, the improvement comprising:

an interchangeable interposer device releasably secured between the mounting table and at least one of the vibrator assemblies, the interposer device having a predetermined spring constant to achieve a desired shock response constant of the shaker table assembly, the interposer device removable from the shaker table assembly upon release of the vibrator assembly only from the mounting table.

2. The improvement of claim 1 wherein the interposer device has an aperture formed therein, and further comprising a single mounting bolt extending through the vibrator assembly, the aperture of the interposer device, and the mounting table thereby releasably securing the interposer device between the mounting table and the vibrator assembly.

3. The improvement of claim 1 wherein the interposer device has a slot formed therein, and further comprising a mounting bolt extending through the slot releasably securing the interposer device between the mounting table and the vibrator assembly.

4. The improvement of claim 1 wherein the interposer device is constructed from a polyethersulfone material.

5. The improvement of claim 1 wherein the interposer device is formed from a substantially planar material.

6. An interposer device for adjusting and controlling the shock response of a shaker table assembly, the shaker table assembly having a mounting table and at least one vibrator assembly, the interposer device comprising:

a substantially planar plate having an aperture formed therethrough, the plate positioned between the mounting table and the vibrator assembly, the planar plate having a predetermined desired spring constant; and a first mounting bolt extending through the vibrator assembly, the plate, and the mounting table thereby releasably securing the plate between the mounting table and the vibrator assembly.

7. The interposer device of claim 6 wherein the plate is releasably secured between the mounting table and the vibrator assembly.

8. The interposer device of claim 7 wherein the plate has an aperture formed therein.

9. The interposer device of claim 8 and further comprising a first mounting bolt extending through the aperture releasably securing the plate between the mounting table and the vibrator assembly.

10. The interposer device of claim 6 and further comprising a slot formed in the plate wherein the plate is removable from between the mounting table and the vibrator assembly without removing the vibrator assembly from the mounting table.

11. The interposer device of claim 6 wherein the planar plate is constructed from a polyethersulfone material.

12. The interposer device of claim 6 wherein the plate has a surface area, the surface area of the plate defining the spring constant of the interposer device.

13. The interposer device of claim 6 wherein the plate has a length, the length of the plate defining the spring constant of the interposer device.

14. The interposer device of claim 6 wherein the plate has a modulus of elasticity, the modulus of elasticity of the plate defining the spring constant of the interposer device.

15. A method for adjusting and controlling the shock response of a shaker table assembly, the shaker table assembly having a mounting table and at least one vibrator assembly mounted to the mounting table, the method comprising:

releasably securing an interposer device between the mounting table and the vibrator assembly thereby defining a shock response of the shaker table assembly the interposer device removable from the shaker table assembly upon release of the vibrator assembly only from the mounting table.

16. The method of claim 15 and further comprising forming an aperture in the interposer device.

17. The method of claim 15 and further comprising forming a slot in the interposer device.

18. The method of claim 16 and further comprising inserting a first bolt through the vibrator assembly, the aperture of the interposer device, and the mounting table thereby releasably securing the interposer device between the mounting table and the vibrator assembly.

19. The method of claim 15 and further comprising constructing the interposer device from a polyethersulfone material.

20. The method of claim 15 and further comprising defining the spring constant of the interposer device by an area, a length, and a modulus of elasticity of the interposer device.

* * * * *